United States Patent

Herbst

[11] Patent Number: 5,960,456
[45] Date of Patent: Sep. 28, 1999

[54] METHOD AND APPARATUS FOR PROVIDING A READABLE AND WRITABLE CACHE TAG MEMORY

[75] Inventor: Joseph E. Herbst, Milpitas, Calif.

[73] Assignee: National Semiconductor Corporation, Santa Clara, Calif.

[21] Appl. No.: 08/649,365

[22] Filed: May 17, 1996

[51] Int. Cl.$^6$ .................................................. G06F 12/00
[52] U.S. Cl. .......................................................... 711/141
[58] Field of Search ............................ 711/141, 144, 711/156

[56] References Cited

U.S. PATENT DOCUMENTS

| | | | |
|---|---|---|---|
| 4,794,523 | 12/1988 | Adan et al. | 711/156 X |
| 4,939,641 | 7/1990 | Schwartz et al. | 711/144 X |
| 5,287,481 | 2/1994 | Lin | 711/135 |
| 5,497,470 | 3/1996 | Liencres | 711/141 X |
| 5,535,358 | 7/1996 | Kimura et al. | 711/156 X |

*Primary Examiner*—David L. Robertson
*Attorney, Agent, or Firm*—Limbach & Limbach LLP

[57] ABSTRACT

A Cache Memory Controller which operates in conjunction with a TAG Random Access Memory (TAG RAM) coupled to the lower order bits on a host address bus is provided. The Cache Memory Controller selects the data to be written to TAG RAM from two or more sources. One of these sources provides snoop address signals and another provides invalidating signals. During a read operation, the lower order bits of the address on the address bus address the TAG RAM while the n higher order bits are passed to a shifter and to a compare circuit. In response to the lower order bits of the address provided, the TAG RAM generates an n-bit TAG data output signal. If this data output compares exactly with the n higher order bits on the host address bus, the compare circuit will indicate a hit. If the compare circuit does not indicate a hit, the n higher order address bits are written into the TAG RAM. Data from main memory is then loaded into the cache memory. During a write operation, the lower order bits address the TAG RAM, with the n higher order being passed to the shifter as before. Upon the occurrence of a TAG write enable signal, the output of the shifter is written into the TAG RAM as data at the TAG RAM address corresponding to the address on the lower order address lines of the host bus. Data is then loaded from main memory into the cache memory.

16 Claims, 2 Drawing Sheets

METHOD AND APPARATUS FOR PROVIDING A READABLE AND WRITABLE CACHE TAG MEMORY

BACKGROUND OF THE INVENTION

1. Field of the Invention

The present invention relates generally to computer systems, and more particularly, to a method and apparatus for providing a cache memory controller which facilitates the writing and reading of data from TAG memory.

2. Description of the Related Art

Recent developments in computer technology have included the widespread implementation of a direct mapped cache memory in small computers so as to improve system performance (speed). The use of a small, high speed cache in a computer system permits the use of relatively slow but inexpensive DRAM for the large main memory space. Cache memory is essentially a small, fast memory implemented on the CPU bus, in addition to a full but slower main memory on the system bus. A cache memory utilizes specialized hardware to assure that currently used parts of main memory are copied into the cache memory, and that data addressed in cache memory is still identical to the data in the corresponding locations of main memory before presenting such data as valid data on the data bus.

In general, a direct mapped cache memory comprises a high speed data RAM and a parallel high speed TAG RAM. Each RAM address in the data cache is the same as the low-order bits of the corresponding main memory address to which the entry corresponds, the high-order portion of the main memory address being stored in the TAG RAM as TAG data. The TAG RAM typically also contains a "valid" bit corresponding to each entry, indicating whether the TAG and data in that cache memory entry are valid.

When a CPU requests data from memory, the address of the data in main memory is put out on the address bus. The lower-order portion of the address is supplied as an address to both the cache data and the cache TAG RAMs. The TAG data for the selected cache entry is compared with the high-order portion of the CPU's address and, if it matches, then a "cache hit" is indicated and the data from the cache data RAM is output to the data bus. If the TAG data does not match the high-order portion of the CPU's address, or if the TAG data is invalid, then a "cache miss" is indicated, and the data is fetched from main memory in a normal main memory fetch sequence. When fetched, the data and address portions are also placed in the cache memory for potential future use, overwriting the previous entry at the corresponding cache memory address.

In existing PC AT-compatible computers, there is no way to directly read or write information in the cache TAG RAM. In the typical PC AT-compatible computer, the data pins of the TAG RAM are permanently coupled to receive input from the high-order address leads of the local bus, and are permanently coupled to provide output to a TAG match comparator. Cache TAG entries have no corresponding address in the main memory or I/O address space. For diagnostic purposes, however, it would be desirable to be able to write any desired data to a selected TAG RAM entry, and also to read the data currently in a TAG RAM entry.

U.S. Pat. No. 5,287,481 discloses one solution to this problem by providing cache control circuitry which selects the data to be written to TAG RAM from two or more sources. One of the sources is the CPU address bus and the other is a register in the chipset which may be written to an entry in the TAG RAM by writing the information to the chipset register and then selecting the cache control mode which writes the information from the register into the TAG RAM on the next main memory read access. The low-order address bits for the read access address the TAG RAM, and an additional cache control mode is provided in which the information read from a TAG entry addressed in a read access is written to the chipset register and made available for reading by the CPU. An additional mode may be selected in which the address of a noncacheable secondary memory block is selected for writing to the cache TAG RAM at the address specified on the CPU address lines during a read access to main memory, which invalidates the corresponding cache data line entry.

Thus, the present invention provides an alternate solution to the problems in existing cache memories as discussed above.

SUMMARY OF THE INVENTION

A Cache Memory Controller which operates in conjunction with a TAG Random Access Memory (TAG RAM) coupled to the lower order bits on a host address bus is provided. The Cache Memory Controller selects the data to be written to TAG RAM from two or more sources. One of these sources provides snoop address signals. Another of these sources provides invalidating signals.

During a read operation, the TAG RAM is addressed by the lower order bits of the address on the address bus while n higher order bits of the address on the host address bus are passed to a shifter and to a compare circuit. Generally n is equal to 8 because 32k×8 is a standard TAG RAM chip. However, n can be more or less than 8 depending on the size of the L2 (level-2) cache controller. 11 TAG bits are supported by using 2 32k×8 TAG RAM chips, but typically n is 8 or 11. In response to the lower order bits of the address, the TAG RAM generates an n-bit TAG data output signal. If the n-bit TAG data output provided by TAG RAM compares exactly with the n higher order bits on the host address bus, then the compare circuit will provide an output indicating a hit.

If, in the read operation, the compare circuit does not indicate a hit, then the n higher order address bits on the host address bus are held and, on the occurrence of a TAG write enable signal, they are written into the TAG RAM as data at the TAG RAM address corresponding to the address on the lower order address lines of the host address bus. Data from main memory is then loaded into the cache memory at a location determined by the lower order bits.

In a normal host CPU write operation, the lower order bits of the address on the address bus address the TAG RAM, with n higher order bits of the address on the host address bus being passed to a shifter. Upon the occurrence of a TAG write enable signal, the output of the shifter is written into the TAG RAM as data at the TAG RAM address corresponding to the address on the lower order address lines of the host bus. Data is then loaded from main memory into the cache memory at an address determined by the lower order address bits.

DETAILED DESCRIPTION OF THE PREFERRED INVENTION

Figure 1:
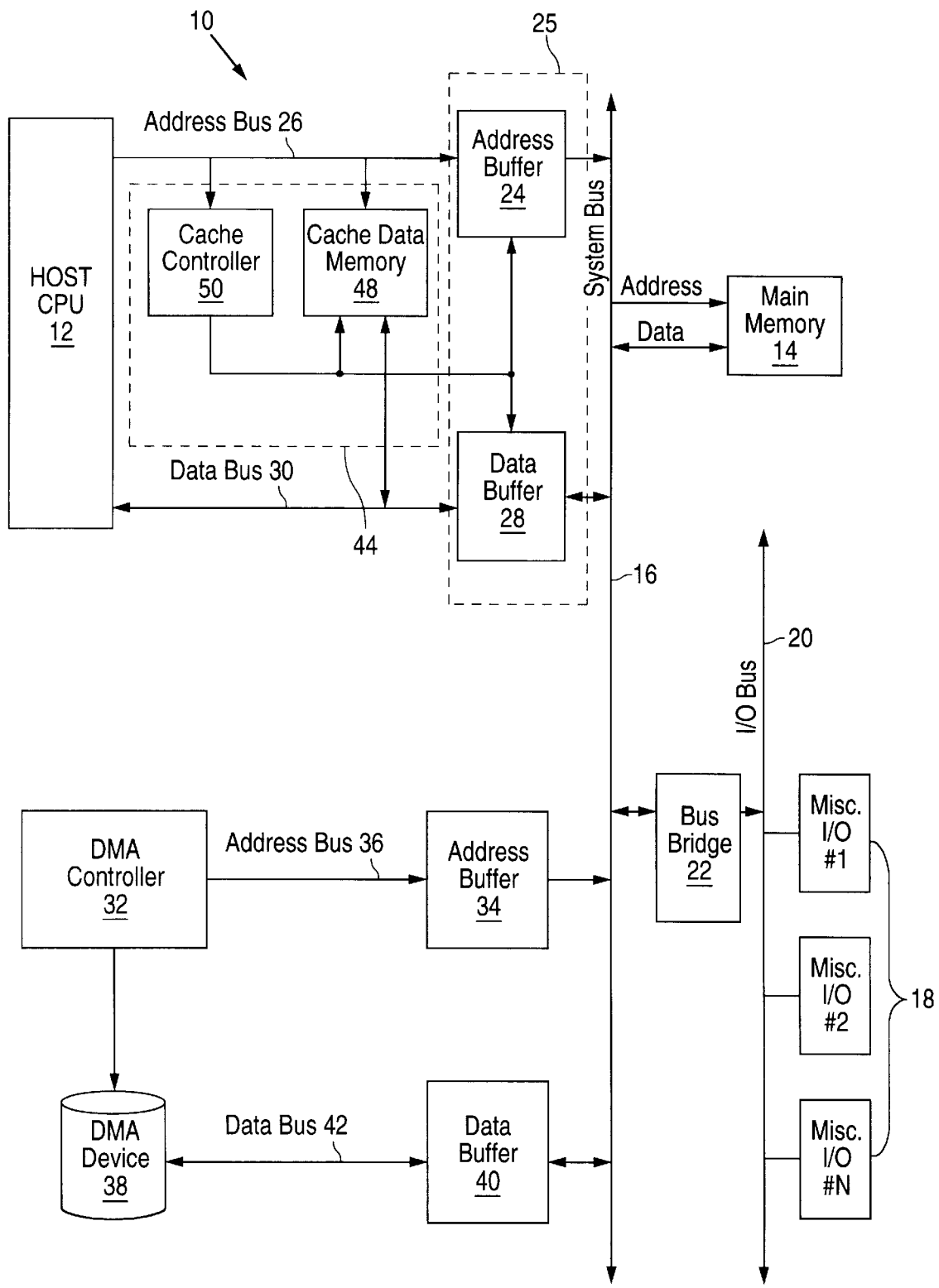
FIG. 1 is a system block diagram illustrating an exemplary processor system in which the apparatus and method of the present invention is used.

The present invention is described in reference to a processor system 10 with a common bus, shared memory and resources. FIG. 1 illustrates a conventional processor system 10 which comprises a Central Processing Unit (CPU) 12 and a Main Memory 14. The host CPU 12 and Main Memory 14 are coupled to a system bus 16. The processor system 10 may also include various I/O and peripheral modules (i.e., MISC. I/O #1, MISC. I/O #2, . . . MISC. I/O #N) 18, which are coupled along an I/O bus 20. It should be understood, however, that further devices may be installed on the system bus 16 and on the I/O bus 20, as is well-known in the art. Preferably, an Extended Industry Standard Architecture ("EISA"), an Industry Standard Architecture ("ISA"), or Peripheral Component Interconnect ("PCI") I/O bus may be used. A bus bridge 22 provides an interface between the system bus 16 and the I/O bus 20 to arbitrate the data flow between the peripheral devices and the system bus 16, typically operating at different clock rates.

The host CPU 12 provides address information to Main Memory 14 via an Address buffer 24, which receives the address information from host CPU 12 through address bus 26. Data is communicated between the host CPU 12 and Main Memory 14 through a data buffer 28, which communicates bi-directionally with the host CPU 12 via data bus 30. The processor system 10 also includes a Direct Memory Access Controller 32, which provides address information to Main Memory 14 through Address buffer 34. The Address buffer 34 receives the address information from the DMA Controller 32 via address bus 36. The DMA Controller 32 controls a DMA Device 38, which communicates bi-directionally with Main Memory 14 via a Data Buffer 40. Address Buffer 24 and Data Buffer 28 can also be on one chip 25. Data is communicated bi-directionally to the Data Buffer 40 via Data bus 42. The buffers 24, 28, 34 and 40 serve to increase the current available from the host CPU 12 to drive the address inputs of dynamic read only memory (DRAM) in the processor system 10, and also serve to isolate the host CPU 12 from the system bus and Main Memory 14 when other devices must have control of the system bus or Main Memory 14. Examples of such devices include DRAM refresh circuitry and DMA devices such as a small computer system interface (SCSI) port, sound or audio card and disk I/O.

The processor system 10 further includes a cache memory 44 which consists of a Cache Data Memory (or Data RAM) 48 and a Cache Controller 50. The Address Buffer 24 and Data Buffer 28 serve to isolate the cache memory 44 from the system bus 16. The Cache Data Memory 48 is a small, fast memory used for storing replicas of instructions and data which may be accessed more slowly from Main Memory 14. The Cache Controller 50 coordinates the movement of data into and out of the Cache Data Memory 48.

Figure 2:
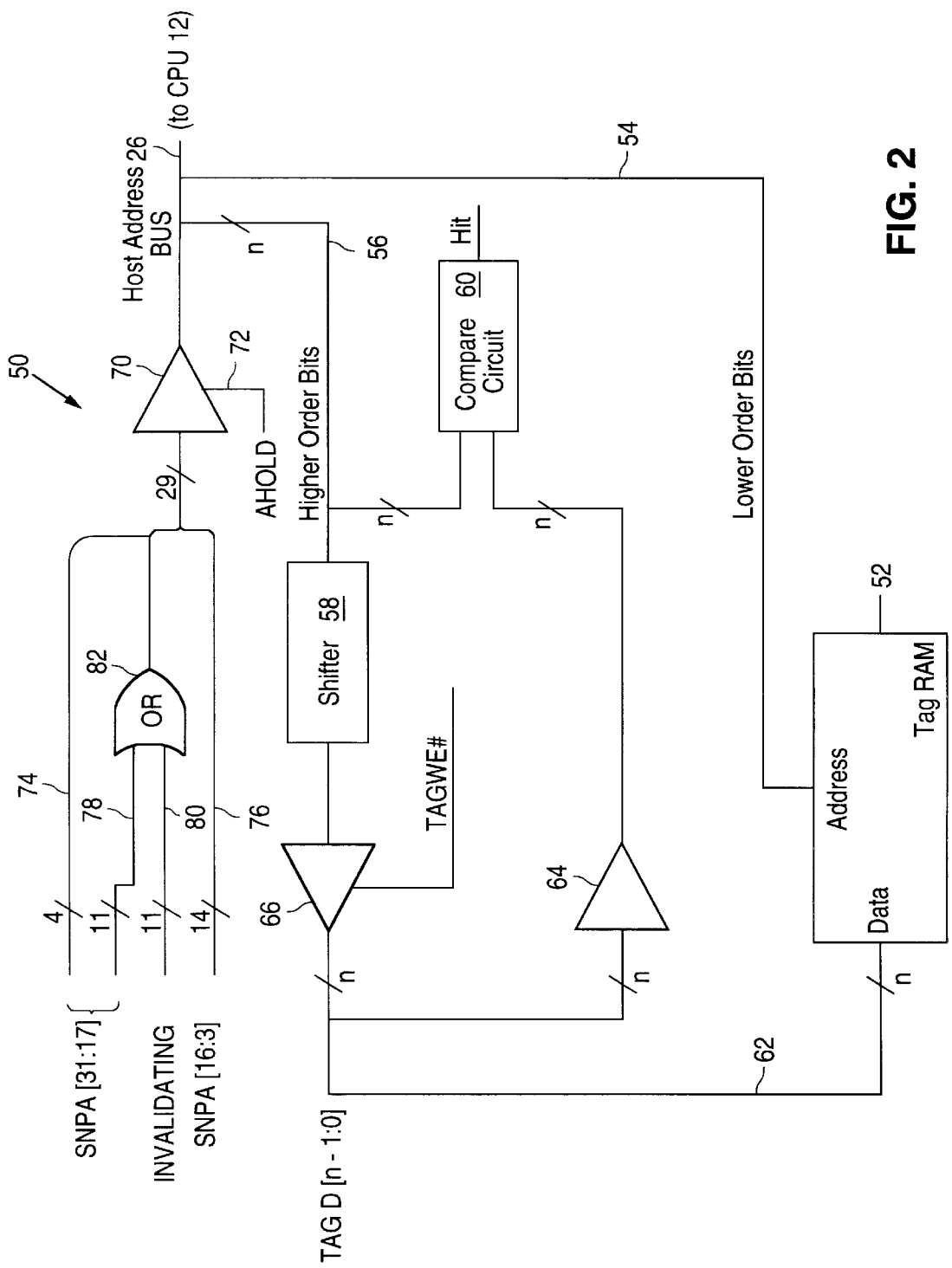
FIG. 2 is a block diagram illustrating a preferred embodiment of a cache memory controller in accordance with the present invention.

FIG. 2 is a block diagram of the Cache Memory Controller 50 of the present invention. The Cache Memory Controller 50 operates in conjunction with a TAG Random Access Memory (TAG RAM) 52, which is coupled to the lower order bits on the host address bus 26. In a normal host central processing unit (CPU) 12 read operation, the lower order bits of the address on the address bus 26 address the TAG RAM 52 via signal lines 54. At the same time, n higher order bits of the address on the host address bus 26 are passed via signal lines 56 to a shifter 58 and to one set of n inputs of a compare circuit 60. In response to the lower order bits of the address provided via signal lines 54, the TAG RAM 52 generates an n-bit TAG data output signal via signal lines 62. This signal is presented as the second input to the compare circuit 60 through n buffer amplifiers 64. If the n-bit TAG data output provided by TAG RAM 52 compares exactly with the n higher order bits on the host address bus 26, then the compare circuit 60 will provide an output indicating a hit. This means that the data stored in cache memory 48 (see FIG. 1) at the address on the host address bus 26 is valid data. The cache data memory 48 is then addressed using the lower order bits of the address on the host address bus 26.

If, on the other hand, the compare circuit 60 does not indicate a hit, then the n higher order address bits on the host address bus 26 are held in the shifter 58, and on the occurrence of a TAG write enable signal TAGWE#, the output of the shifter 58 is coupled through n tri-state buffers 66 and written into the TAG RAM 52 as data at the TAG RAM address corresponding to the address on the lower order address lines of the host bus 26. As part of this same host CPU data read operation, the data being read by the host CPU 12 appearing on the host data bus associated with the address on the host address bus 26 will be written into the cache memory 48 (see FIG. 1) so that both the TAG RAM 52 and cache memory 48 will be updated.

In a normal host CPU write operation, the lower order bits of the address on the address bus 26 address the TAG RAM 52, with the n higher order bits of the address on the host address bus 26 being passed to the shifter 58 as before. Upon the occurrence of a TAG write enable signal TAGWE#, the output of the shifter 58 is coupled through the n tri-state buffers 66 and written into the TAG RAM 52 as data at the TAG RAM address corresponding to the address on the lower order address lines of the host bus 26. Also as part of this same host CPU 12 write operation, the data being written by the host CPU 12 appearing on the host data bus 30 (see FIG. 1) associated with the address on the host address bus 26 will be written into the cache memory 48 using the lower order address bits of the address on the host address bus 26, so that both the TAG RAM 52 and cache memory 48 will again be updated. The Cache Memory Controller 50 of the preferred embodiment further comprises 29 tri-state buffers 70 having outputs which are coupled to the host address bus 26. In general, during the foregoing operations, a signal AHOLD provided to each of the 29 tri-state buffers 70 via signal line 72 holds the 29 tri-state buffers 70 off so that the outputs of the tri-state buffers 70 float and can swing as required in response to addresses on the host address bus 26 from the host CPU 12. The 29 tri-state buffers receive twenty-nine corresponding input, as shown in FIG. 2. Eighteen of the twenty-nine inputs originate from four of the fifteen address lines SNPA [31:17] 74 and from the fourteen address lines SNPA [16:3] 76 which are coupled directly through the tri-state buffers 70 to drive the host address bus 26. Addresses SNPA[2:0] are not required in the Controller 50 itself in the preferred embodiment, as the Cache Memory 48 is eight bytes wide, addresses SNPA[2:0] being decoded directly when there is a need to determine which of the eight bytes is being addressed. The tri-state buffers 20 further receive the remaining eleven inputs from eleven OR gates 70 based upon the ORing of eleven of the address lines SNPA[31:17] 78 and invalidated signals via eleven signal lines 80. That is, as shown in FIG. 2, the eleven address lines SNPA[31:17] 78 and the invalidating signals provided via signal lines 80 are provided to the tri-state buffers 70 through eleven OR gates 82, as described in detail below. The tri-state buffers 70 are enabled by signal AHOLD provided via signal line 72 to generate an output signal via the host address bus 26, as discussed in detail in the following sections.

The present invention provides for temporary relinquishment of control of the host address bus 26 by the host CPU 12 in certain situations relating to cache memory operation. One of these situations is referred to as snooping, where a device other than the host CPU 12 becomes master and seeks to read data from or write data to main memory 14 (see FIG. 1) or to other devices on the host address bus 26 and data bus 30. For this purpose, the tri-state buffers 70 are enabled by the signal AHOLD which is provided via signal line 72. When enabled, invalidating signals provided via signal lines 80 to the eleven OR gates 82 are held low. This in turn enables the snooping address lines SNPA[31:17] 74, 78 and SNPA[16:3] 76 to be coupled through buffers 70 to drive the host address bus 26, such that the outputs of the OR gates 82 correspond to the inputs of the OR gates on lines 78. The snooping addresses are generated externally by whatever device has become master and are provided to the host CPU 12 via the I/O bus 20. As is shown in FIG. 1, the I/O bus 20 is a bus separate and apart from the host address bus 26. In the present invention, the snooping address is not an address taken from the host address bus 26. By driving the host address bus 26 through the snooping address lines SNPA[31:17] 74, 78, and SNPA[16:3] 76, normal cache memory operations may be carried out as previously described.

In addition, there are three situations where cache data needs to be invalidated. Invalidation is done by writing specific data (FF) to the TAG RAM 52 at a TAG RAM address which, on subsequent output when the TAG RAM 52 is addressed with the same address, will be interpreted as a cache data invalidating output. To write the invalidating address, the 11 invalidating lines 80 to the eleven OR gates 82 are driven high, forcing all outputs of the OR gates 82 high. The signal AHOLD enables the 29 tri-state buffers 70, with n of the eleven invalidity signals driven high being coupled to the shifter 58. Upon the occurrence of the signal TAGWE# which enables the n buffers 66 coupled to the shifter 58, the invalidating address is written into the TAG RAM 52, via signal lines 62, as the TAG data FF or FFF. On any subsequent read operation by the host CPU 12 to the same TAG RAM 52 address prior to the same being overwritten by valid TAG data (something other than FF), the readout of the TAG data FF will be interpreted as an invalid cache address, so that the data in the cache memory 48 will be recognized as invalid data and not used.

The three situations in which it is desired to write the invalidating address FF into the TAG RAM 52 as TAG data are as follows. First, the invalidating address FF is written into the TAG RAM 52 upon the occurrence of a write to System Management Mode (SMM). SMM relates to certain protocols of the Intel, Cyrix, and Advanced Micro Devices X86 family of processors. In this embodiment, the invalidating lines are driven high based on the signals on two CPU pins, namely SMIACT# and WRITTEN. These signals are independent of the host address bus 26.

Secondly, the invalidating address FF may be written into the TAG RAM 52 during a write to Read Only Memory (ROM) Space. ROM by its nature cannot ordinarily be altered and accordingly, an attempt to write to ROM space is an invalid operation. However, since the ROM contents cannot be changed by an attempt to write to ROM, an attempt to write the ROM will not, in itself, cause a fatal error, as the contents of the ROM will remain unchanged and accordingly available for subsequent reading. On the other hand, because the data attempted to be written to the ROM will also be stored in cache memory, it is important that this cache data be invalidated so that a subsequent read of the same ROM location will result in an actual read of ROM, as opposed to the reading of the invalid data in cache memory.

ROM address space in a system is a pre-defined region of host CPU address space, and accordingly an attempt to write to ROM is detected by an attempt to write anywhere within this pre-defined address space, in part by the decoding of the address information in a number of the upper address lines of the host address bus 26.

Thirdly, the invalidating address FF may be written into the TAG RAM 52 during Second Level Snooping. This is a form of snooping where the control to drive the invalidating signals high is generated from an external system address that is again different from, and independent of, the host address bus 26.

In all three of the foregoing cases, the 11 invalidating bits are driven high in unison, n of which become TAG data FF, to be interpreted on later retrieval as indicating invalid data in the cache RAM.

Although the present invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A cache memory controller for use with a cache memory having a plurality of TAG data lines, the cache memory controller being coupled to an address bus having a first plurality of address lines and a second plurality of address lines, the cache memory controller comprising:

a compare circuit coupled to the first plurality of address lines a TAG memory coupled to the second plurality of address lines, said TAG memory providing a TAG data output signal to the compare circuit, the compare circuit providing a compare circuit output if said TAG data output signal is the same as the first plurality of addresses, wherein the first plurality of address lines are separate from the second plurality of address lines; and a shift circuit coupled to the first plurality of address lines, the shift circuit for storing the first plurality of addresses if the TAG data output signal is not the same as the first plurality of addresses, wherein the first plurality of addresses are further stored in the TAG memory in response to an enable signal.

2. A cache memory controller for use with a cache memory having a plurality of TAG data lines, the cache memory controller being coupled to an address bus having a first plurality of address lines and a second plurality of address lines, the cache memory controller comprising:

a compare circuit coupled to the first plurality of address lines for providing a first plurality of addresses;

a TAG memory coupled to the second plurality of address lines, said TAG memory providing a TAG data output signal to the compare circuit, the compare circuit providing a compare circuit output if said TAG data output signal is the same as the first plurality of addresses, wherein the first plurality of address lines are separate from the second plurality of address lines;

a plurality of buffers for receiving inputs from the address bus; and a OR gate having a first input, a second input and an output, the output being coupled to the input of the plurality of buffers, the first input being coupled to the address bus, the second input being coupled to a plurality of invalidating lines.

3. The apparatus of claim 2, further comprising a snoop signal line for receiving a snoop address, the signal line being coupled to the plurality of buffers.

4. The apparatus of claim 3, further comprising a multiplexer, the multiplexer having inputs coupled to outputs of the plurality of buffers, the multiplexer providing outputs from any one of: the first input of the OR gate, the second input of the OR gate or the snoop signal line, in accordance to a select enable signal.

5. A cache memory controller for use with a cache memory having a plurality of TAG data lines, the cache memory controller being coupled to an address bus having a first plurality of address lines and a second plurality of address lines, the cache memory controller comprising:

a compare circuit coupled to the first plurality of address lines;

a TAG memory coupled to the second plurality of address lines, said TAG memory providing a TAG data output signal to the compare circuit, the compare circuit providing a compare circuit output if said TAG data output signal is the same as the first plurality of addresses;

a first data path coupled to the first plurality of address lines, the first data path including a shifter for holding the first plurality of addresses if the TAG data output signal is not the same as the first plurality of addresses; and a second data path coupled to the first data path for providing the first plurality of addresses to the TAG memory in response to an enable signal.

6. A cache memory controller for use with a cache memory having a plurality of TAG data lines, the cache memory controller being coupled to an address bus having a first plurality of address lines and a second plurality of address lines, the cache memory controller comprising:

a compare circuit coupled to the first plurality of address lines for providing a first plurality of addresses;

a TAG memory coupled to the second plurality of address lines, said TAG memory providing a TAG data output signal to the compare circuit, the compare circuit providing a compare circuit output if said TAG data output signal is the same as the first plurality of addresses;

a first data path coupled to the first plurality of address lines, for storing the first plurality of addresses if the TAG data output signal is not the same as the first plurality of addresses;

a second data path coupled to the first data path for providing the first plurality of addresses to the TAG memory in response to an enable signal;

a plurality of buffers for receiving inputs from the address bus; and an OR gate having a first input, a second input and an output, the output being coupled to the input of the plurality of buffers, the first input being coupled to the address bus, the second input being coupled to a plurality of invalidating lines.

7. The apparatus of claim 6, further comprising a snoop signal line for receiving a snoop address, the signal line being coupled to the plurality of buffers.

8. The apparatus of claim 7, further comprising a multiplexer, the multiplexer having inputs coupled to outputs of the plurality of buffers, the multiplexer providing outputs from any one of: the first input of the OR gate, the second input of the OR gate or the snoop signal line, in accordance to a select enable signal.

9. A method for providing a cache memory controller for use with a cache memory having a plurality of TAG data lines, the cache memory controller being coupled to an address bus having a first plurality of address lines and a second plurality of address lines, the method comprising the steps of:

providing a compare circuit coupled to the first plurality of address lines;

providing a TAG memory coupled to the second plurality of address lines, said TAG memory providing a TAG data output signal to the compare circuit;

comparing the first plurality of addresses to the TAG data output signal;

generating a compare circuit output if the TAG data output signal is the same as the first plurality of addresses;

holding the first plurality of addresses in a shifter if the TAG data output signal is not the same as the first plurality of addresses; and storing the first plurality of addresses in the TAG memory in response to an enable signal.

10. The method of claim 9 further comprising the steps of:

providing a plurality of buffers for receiving inputs from the address bus; and providing an OR gate having a first input, a second input and an output, the output for coupling to the input of the plurality of buffers, the first input for coupling to the address bus, the second input for coupling to a plurality of invalidating lines.

11. The method of claim 10, further comprising the step of providing a snoop signal line for receiving a snoop address, the signal line for coupling to the plurality of buffers.

12. The method of claim 11, further comprising the step of selecting and outputting addresses from any one of: the first input of the OR gate, the second input of the OR gate or the snoop signal line, in accordance to a select enable signal.

13. A method for providing a cache memory controller for use with a cache memory having a plurality of TAG data lines, the cache memory controller being coupled to an address bus having a first plurality of address lines and a second plurality of address lines, the method comprising the steps of:

providing a compare circuit coupled to the first plurality of address lines;

providing a TAG memory coupled to the second plurality of address lines, said TAG memory providing a TAG data output signal to the compare circuit, the compare circuit providing a compare circuit output if said TAG data output signal is the same as the first plurality of addresses;

providing a first data path coupled to the first plurality of address lines, for storing the first plurality of addresses if the TAG data output signal is not the same as the first plurality of addresses;

providing a second data path coupled to the first data path for providing the first plurality of addresses to the TAG memory in response to an enable signal, wherein the step of providing a first data path includes the step of providing a shifter for holding the first plurality of addresses.

14. A method for providing a cache memory controller for use with a cache memory having a plurality of TAG data lines, the cache memory controller being coupled to an address bus having a first plurality of address lines and a second plurality of address lines, the method comprising the steps of:

providing a compare circuit coupled to the first plurality of address lines for providing a first plurality of addresses;

providing a TAG memory coupled to the second plurality of address lines, said TAG memory providing a TAG data output signal to the compare circuit, the compare circuit providing a compare circuit output if said TAG data output signal is the same as the first plurality of addresses;

providing a first data path coupled to the first plurality of address lines, for storing the first plurality of addresses if the TAG data output signal is not the same as the first plurality of addresses;

providing a second data path coupled to the first data path for providing the first plurality of addresses to the TAG memory in response to an enable signal;

providing a plurality of buffers for receiving inputs form the address bus; and providing an OR gate having a first input, a second input and an output, the output being coupled to the input of the plurality of buffers, the first input being coupled to the address bus, the second input being coupled to a plurality of invalidating lines.

15. The method of claim 14, further comprising the step of providing a snoop signal line for receiving a snoop address, the signal line for coupling to the plurality of buffers.

16. The method of claim 15, further comprising the step of selecting and outputting addresses from any one of: the first input of the OR gate, the second input of the OR gate or the snoop signal line, in accordance to a select enable signal.

* * * * *